3,431,141
HIGH TEMPERATURE OXIDATION
RESISTANT ARTICLES
James E. Eorgan, Boyertown, Pa., assignor to Kawecki Chemical Company, New York, N.Y., a corporation of Pennsylvania
No Drawing. Filed Feb. 18, 1966, Ser. No. 528,415
U.S. Cl. 117—135.1                          10 Claims
Int. Cl. B32b 15/00; C23c 17/00

The present invention relates to articles of refractory material, and, more particularly, to such articles made resistant to oxidation at high temperature by a protective adherent, refractory coating.

Refractory metals such, for example, as tantalum, columbium, tungsten and molybdenum, and alloys based upon the refractory metals, are noted for their ability to withstand high temperature, but they are readily corroded by an oxidizing atmosphere at high temperatures. Expedients have been proposed for protecting these refractory materials against surface oxidation, but the problem has been complicated by the requirements that the protective material be refractory, be oxidation resistant, form a coherent covering, have a coefficient of linear expansion compatible with that of the refractory base material and form a strong bond with the substrate without any reaction which would impair the strength and ductility of the substrate.

It has heretofore been proposed that the surface of the refractory material be protected against high temperature oxidation by a substantially impervious coating of zirconium diboride or titanium diboride. The zirconium or titanium diboride can be readily applied to the refractory metal base material with a plasma jet to form a tightly adherent and substantially continuous protective layer. The protective coating thus obtained is highly resistant to oxidation at elevated temperatures and possesses the other characteristics required for such coatings hereinbefore mentioned.

I have now found that the already good resistance to high temperature oxidation, the useful service life and the maximum service temperature of such coated refractory metal articles can be significantly increased if a new composition comprising a special mixture of zirconium diboride, titanium diboride and metallic silicon is employed as the protective coating. The three components of my new oxidation resistant coating must be present therein in certain specified proportions in order to obtain the improvements in function and performance referred to. Moreover, I have found that the aforesaid improvements, and in particular the increase in the useful service life and maximum service temperature, are significantly enhanced if the refractory article is subjected to a special heat treatment following the application of the coating to the article.

Specifically, I have found that if the oxidation resistant coating contains from about 85% to 99% by weight of a specific mixture of zirconium and titanium diborides and from about 1 to 15% by weight of silicon, and particularly if the coated refractory article is heat treated at a temperature of from about 1200 to 1600° C. for a period of about one hour, a significantly improved product is obtained. Accordingly, the improved refractory article of the present invention comprises a refractory metal base material the surface of which is protected against high temperature oxidation by a substantially impervious coating comprising from about 85 to 99% and preferably about 95%, by weight of mixed zirconium and titanium diborides, and from about 1 to 15%, and preferably about 5%, by weight of silicon. The weight ratio of zirconium diboride to titanium diboride in the mixture of diborides should be between about 1:3 and 3:1, and preferably it is about 1:1. Advantageously, the refractory article is heated in vacuum to a temperature of from about 1200 to 1600° C., and preferably from about 1400 to 1500° C., for about one hour to increase the useful service life and the maximum service temperature of the article.

The zirconium diboride and titanium diboride which are applied to the refractory base material pursuant to the invention should be in finely divided form, and it is fortuitous that all presently known methods of making these diborides produce them in the form of a powder which is readily amenable to application to a refractory metal by means of a plasma spray. Zirconium diboride (and titanium diboride) is obtained either by electrolytic deposition from a fused melt of an alkali metal double fluoride of each of the elements zirconium (or titanium) and boron, or by high temperature reaction between boron carbide (B4C) and zirconium (or titanium) dioxide, or by high temperature reaction between zirconium (or titanium) dioxide, boric acid and carbon.

The finely divided zirconium diborides and titanium dboride constituents of my new refractory coating may be produced separately by any of the aforementioned procedures, in which case the two diboride powders are physically mixed together in the relative proportions specified herein prior to being applied to the surface of the refractory metal article. Or, advantageously, the desired mixture of zirconium and titanium diborides can be prepared in situ by any one of the procedures described by simply using the desired proportions of zirconium and titanium compounds in the initial reaction mixtures. In the latter case, the diboride powder product of the reaction may be a physical mixture of discrete particles of $ZrB_2$ and $TiB_2$, or it may be a physical (that is, an alloy-like) or chemical combination of the two diborides, and the term "mixed zirconium and titanium diborides" employed herein is intended to apply equally to such physical and chemical mixtures and combinations.

Whether the diborides are produced separately or together, the weight ratio of zirconium diboride to titanium diboride in the coating composition of my invention in between about 1:3 and 3:1, and preferably is about 1:1. When the relative proportion of zirconium to titanium in the coating is within the limits specified, the coated article has significantly greater resistance to high temperature oxidation than do articles having coatings formed either of zirconium diboride or titanium diboride alone. Coatings containing amounts of zirconium diboride or titanium diboride in excess of those specified herein tend to approach rather rapidly the somewhat lower resistance to high temperature oxidation possessed by coatings of relatively pure zirconium or titanium diboride.

In addition to the mixed zirconium and titanium diboride content of the coating, it also contains from about 1 to 15%, and preferably about 5%, by weight of silicon. Metallic silicon is produced by any of the known procedures and is physically reduced to a powder having approximately the same particle size as the mixed diboride powder constituent of the coating compositions. The presence of silicon in the amounts specified markedly improves the adherence of the coating on the underlying refractory base material, and it appears to reduce the porosity and increase the density of the coating with a concomitant improvement in the resistance to high temperature oxidation of the coating.

The zirconium and titanium diborides and silicon powder constituents of the coating composition are thoroughly mixed together in the proper proportions and the diboride-silicon mixture is flame sprayed onto the surface of the refractory metal base by means of a plasma torch. Inasmuch as the diboride-silicon coating is brittle and does not permit subsequent fabrication of an article coated with the diboride-containing mixture, the base or substrate material should be in its finished shape before applying the diboride-silicon coating thereto. There is no limit to the shape of the base material to which the diboride-containing coating is applied other than that imposed by spray coating technique; any surface of the article that can be reached by a spray is amenable to protective coating pursuant to the invention.

Surface treatment of the refractory metal base material prior to application of the diboride-silicon coating is necessary only when this surface is oxide-bearing. That is, the surface of the base material to be coated should be oxide-free, and if an oxide film must be removed this can be done readily by sand or grit blasting, for example. When oxide removal is effected by chemical or electrochemical means, it is advantageous to remove not only the oxide layer but some of the base material itself by an etching action which will yield a surface to which the diboride-silicon coating will more tenaciously adhere.

The diboride-silicon coating is applied to the surface of the refractory metal base material by conventional plasma spray technique. The plasma is formed by an electric arc, and the finely divided diboride-silicon mixture carried advantageously by a stream of inert gas, is directed into the plasma and against the refractory material surface to be coated. The temperature of the plasma is, of course much higher than the melting point of the diboride and silicon constituents of the composition (the melting point of zirconium diboride, for example, is about 3050° C. and that of silicon is about 1420° C.), and consequently the diboride-silicon powder is passed through the plasma at such a rate, depending upon the temperature of the plasma, as to at least surface-melt the particles of diboride and silicon. The resulting stream of diboride and silicon particles, either molten or only surface-molten, impinges upon the surface of the refractory metal base material and immediately hardens thereon as a strong and essentially homogeneous adherent coating or film without reacting therewith so that the individual integrities of the tantalum, tungsten, columbium, or molybdenum base material and of the diboride-silicon coating are not impaired. The spray coating operation is advantageously repeated a number of times to insure an impervious multi-layer coating of the diboride-silicon composition on the base material. In order to prevent the surface of the base material becoming oxidized during the spraying operation, it has been found desirable to cool the coated article after each coat is applied, or alternatively to continuously cool the article throughout the coating operation, until the coating thickness has been built up sufficiently to form a substantially impervious coating capable of excluding the ambient atmosphere from the surface of the base material even at elevated temperatures. For example, when applying a diboride-silicon powder having a particle size range of about 140 to 325 mesh (Tyler Standard) and passing it through a conventional plasma spray gun at a rate such as to only surface-melt the diboride and silicon particles, six coats of the thus-applied diboride-silicon composition on tantalum, columbium, tungsten or molybdenum, with either intermittent cooling of the coated article between each coating application or continuous cooling of the article throughout the coating operation, has been found to give a virtually impervious, continuous film or coating of the diboride-silicon composition over the tantalum or columbium base material.

The coated refractory metal article is then advantageously subjected to a special heat treatment which significantly improves the coated article's resistance to high temperature oxidation so that both the useful service life of the article in a high temperature oxidizing environment and the maximum temperature to which the coated article can be exposed in service are markedly increased. The article is heated in a vacuum to a temperature of from about 1200° to 1600° C., and preferably from about 1400° to 1500° C., for a period of about one hour. The most significant improvement in the coated article's resistnace to high temperature oxidation is obtained when it is vacuum heat treated within th preferred temperature range, and I have found that the optimum temperature for the heat treatment is about 1475° C. Refractory articles coated and heat treated in accordance with the present invention have been successfully subjected to such high temperature oxidizing environments as molten aluminum at about 800° C. and oxidizing atmospheres at about 1200° C. without breakdown of the oxidization resistant coating during the normal service life of such articles.

The following examples are illustrative of the formation of the novel product of the present invention:

A tantalum alloy thermowell, having a size of 0.375 inch O.D. x 0.025 inch wall thickness x 6.5 inches in length, was sprayed with diboride-silicon powder having a particle size of through 140 and on 325 mesh (Tyler Standard). The diboride-silicon powder contained 95% by weight mixed zirconium and titanium diborides and 5% by weight silicon, the weight ratio of zirconium diboride to titanium diboride in the mixture being 1:1. The tantalum alloy thermowell was grit blasted to give an oxide-free roughened surface and was placed on a constant speed turntable in an appropriate spray booth. A plasma flame spray gun was positioned at the front of the booth so that its spray traveled about 2.5 to 3 inches to the tantalum alloy surface to be coated. The plasma flame spray gun utilized an electric arc to excite the inert gases to the ionized state and was fed with the diboride-silicon powder from a feed hopper at a constant rate such as to insure a diboride-silicon powder residence time in the plasma arm sufficient for it to become molten or plastic. The spray rate was about 4.5 pounds per hour of the diboride-containing powder. After the completion of each coating, the hot coated thermowell was allowed to cool to room temperature before the next coat was applied. Alternatively, the tubular thermowell could be continuously cooled during the multi-layer coating operation by directing a cooling fluid into the interior of the thermowell. A total of six coats were deposited to produce a diboride-silicon coating thickness of 0.010 inch. The coated tantalum alloy article was then heated in vacuum at a temperature of 1475° C. for a period of one hour to obtain the desired high temperature oxidation resistant product.

The foregoing procedure was also carried out in connection with a number of other refractory articles, the refractory metal base component of which was formed of tantalum, columbium, tungsten, molybdenum and alloys of these metals. The relative proportion of zirconium diboride and titanium diboride ranged from 25 to 75% (based on the weight of the mixed diborides) and the amount of silicon powder in the various coating compositions ranged from 1 to 15% by weight of the composition.

The product of the present invention is prominently characterized by its resistance to oxidation at very high temperatures at which the tantalum, columbium, tungsten or molybdenum base material itself could not survive under similar conditions. The permanence of the diboride-silicon coating in use is insured by the fact that it forms a tenacious bond with the base material substrate over a wide temperature range and that it has a coefficient of linear thermal expansion between room temperature and 1000° C. which is substantially the same as, or was very close to, that of tantalum, columbium, tungsten and molybdenum, and of many alloys based on a preponderance of these metals. Thus, the coated articles of the invention resist deterioration by thermal changes or when exposed to large thermal gradients. For example it has been found that thermocouple wells consisting of tubes of columbium and of tantalum, surface-coated with a diboride-silicon composition pursuant to this invention, far outlast other known metals when used in aluminum melting furnaces. Tantalum, columbium, tungsten and molybdenum metal, and particularly their alloys, coated with diboride-silicon compositions according to the invention, also hold promise for use in the exhaust system of jet engines and for other applications where high temperature oxidizing conditions are encountered.

I claim:

1. A composite refractory article comprising a refractory metal base material the surface of which is protected against high temperature oxidation by a substantially impervious coating of an oxidation resistant material comprising from about 85 to 99% by weight of mixed zirconium diboride and titanium diboride wherein the weight ratio of $ZrB_2$ to $TiB_2$ is between about 1:3 and 3:1, and from about 1 to 15% by weight of silicon.

2. The composite refractory article according to claim 1 in which the refractory metal is selected from the group consisting of tantalum, columbium, tungsten, molybdenum and the alloys of these metals.

3. The composite refractory article according to claim 1 in which the article is heat treated at a temperature of from about 1200° to 1600° C. for a period of about one hour.

4. The composite refractory article according to claim 1 in which the article is heat treated at a temperature of from about 1400° to 1500° C. for a period of about one hour.

5. The composite refractory article according to claim 1 in which the oxidation resistant material comprises about 95% by weight of said mixed zirconium and titanium diborides and about 5% by weight of said silicon.

6. The composite refractory article according to claim 1 in which the weight ratio of $ZrB_2$ to $TiB_2$ in the oxidation resistant material is about 1:1.

7. The composite refractory article according to claim 1 in which the oxidation resistant material comprises about 95% by weight of said mixed zirconium and titanium diborides and about 5% by weight of said silicon, and in which the weight ratio of $ZrB_2$ to $TiB_2$ in said material is about 1:1.

8. The composite refractory article according to claim 7 in which the article is heat treated at a temperature of from about 1400° to 1500° C. for a period of about one hour.

9. The composite refractory article according to claim 1 in which the surface of the refractory metal base is protected by a multi-layered coating of said oxidation resistant material.

10. In a composite refractory article comprising a refractory metal base material the surface of which is protected against high temperature oxidation by a substantially impervious coating of an oxidation resistant material, the improvement which comprises utilizing as said coating a material comprising from about 85 to 99% by weight of mixed zirconium and titanium diborides wherein the weight ratio of $ZrB_2$ to $TiB_2$ is between about 1:3 and 3:1, and from about 1 to 15% by weight of silicon.

References Cited

UNITED STATES PATENTS

| 3,025,182 | 3/1962 | Schrewelius | 117—46 XR |
| 3,078,554 | 2/1963 | Carlson. | |
| 3,231,417 | 1/1966 | Fuller | 117—135.1 XR |

ALFRED L. LEAVITT, *Primary Examiner.*

W. F. CYRON, *Assistant Examiner.*

U.S. Cl. X.R.

117—46, 105.2